United States Patent [19]

Sanderson

[11] Patent Number: 5,441,327

[45] Date of Patent: Aug. 15, 1995

[54] ADJUSTABLE BICYCLE SEAT

[76] Inventor: Mark B. Sanderson, 717 5th Ave., Salt Lake City, Utah 84103

[21] Appl. No.: 12,582

[22] Filed: Feb. 3, 1993

[51] Int. Cl.⁶ ............................................. B62J 1/04
[52] U.S. Cl. ............................ 297/195.1; 297/215.15
[58] Field of Search .................. 297/215.15, 215.14, 297/215.13, 195.1, 313, 337; 403/84, 24

[56] References Cited

U.S. PATENT DOCUMENTS

| | | | |
|---|---|---|---|
| 491,578 | 2/1893 | Mercer | 297/215.15 |
| 585,858 | 7/1897 | Wooster | 297/215.15 |
| 3,302,970 | 2/1967 | Rizzato | 297/195 |
| 3,408,090 | 10/1968 | Fritz et al. | 280/278 |
| 3,858,906 | 1/1975 | Wright | 280/283 |
| 4,108,462 | 8/1978 | Martin | 297/215.15 |
| 4,155,590 | 5/1979 | Cunningham | 297/215.15 |
| 4,231,611 | 11/1980 | Bird | 297/215.15 |
| 4,421,357 | 12/1983 | Shimano | 297/195 |
| 4,568,121 | 2/1986 | Kashima | 297/215.15 |
| 4,772,069 | 9/1988 | Szymski | 297/195 |
| 4,836,604 | 6/1989 | Romano | 297/215.15 |
| 4,915,538 | 4/1990 | Golden et al. | 297/215.15 |
| 4,919,378 | 4/1990 | Iwasaki et al. | 248/295.1 |
| 4,978,167 | 12/1990 | Harvey | 297/195 |
| 5,007,675 | 4/1991 | Musto et al. | 297/195 |
| 5,024,413 | 6/1991 | Papp | 248/623 |
| 5,048,891 | 9/1991 | Yack | 297/195 |
| 5,190,346 | 3/1993 | Ringle | 297/215.15 |
| 5,244,301 | 9/1993 | Kurke et al. | 297/215.15 |

FOREIGN PATENT DOCUMENTS

| | | | |
|---|---|---|---|
| 2675459 | 10/1992 | France | 297/215.15 |
| 209202 | 5/1960 | Germany . | |
| 1282504 | 11/1968 | Germany | 297/215.15 |
| 5964383 | 1/1988 | Japan . | |
| 18766 | of 1896 | United Kingdom | 297/215.15 |
| 1442032 | 7/1976 | United Kingdom | 297/215.15 |
| 463577 | 3/1975 | U.S.S.R. | 297/215.15 |

Primary Examiner—Andrew M. Falik
Assistant Examiner—Amy B. Vanatta
Attorney, Agent, or Firm—Trask, Britt & Rossa

[57] ABSTRACT

Structure associated with the seat of a wheeled vehicle, such as a bicycle, provides adjustability of the seat about a horizontal axis transverse the longitudinal axis of the vehicle, and provides adjustment of the seat in a horizontal plane parallel the longitudinal axis of the vehicle. The structure generally includes first and second seat post members which are articulable about an axle pin, an interlocking element engageable with a locking element to provide selective adjustment of the seat post members relative to each other and a housing surrounding the mechanism. Horizontal adjustment structure generally includes a slidable arm positioned within a bracket, and the bracket is attached to one of the seat post members. The rotational and horizontal adjustments provided by the structure of the invention can be accomplished in a matter of seconds while the rider is seated on the vehicle.

8 Claims, 3 Drawing Sheets

ADJUSTABLE BICYCLE SEAT

BACKGROUND

1. Field of the Invention

This invention relates to seats for use with bicycles, tricycles or similar wheeled vehicles. Specifically, this invention relates to bicycle seats which are adjustable about a horizontal axis transverse the longitudinal axis of the frame of the bicycle, and particularly to adjustability while the seat is being occupied by the rider.

2. Statement of the Art

Adjustability of bicycle seats is a feature well documented in the patent literature. Many mechanisms have been designed to provide adjustability to the height of the bicycle seat relative to the frame of the bicycle. That is, the seat may be adjusted up or down so that the rider's seat is higher or lower than the handlebars. Examples of such teachings are U.S. Pat. No. 3,408,090 to Fritz, et al., issued Oct. 29, 1968; U.S. Pat. No. 3,858,906 to Wright, issued Jan. 7, 1975; U.S. Pat. No. 5,024,413 to Papp, issued Jun. 18, 1991; and Japanese Utility Model Publication (Kokoku) No. 63-558, published Jan. 7, 1988.

Another form of adjustability of a bicycle seat has been provided in movability of the seat along a horizontal axis aligned with the longitudinal axis of the frame. By such adjustment, the rider may position his seat farther away from or closer to the handlebars. Examples of such teachings are German Patentschrift NR. 209292 issued May 25, 1960; U.S. Pat. No. 4,421,357 to Shimano, issued Dec. 20, 1983; U.S. Pat. No. 4,772,069 to Szymski, issued Sep. 20, 1988; U.S. Pat. No. 5,007,675 to Musto, et al., issued Apr. 16, 1991; and U.S. Pat. No. 5,048,891 to Yach, issued Sep. 17, 1991.

A unique structure providing combined vertical and horizontal adjustment to a bicycle seat is disclosed by U.S. Pat. No. 4,919,378 to Iwasaki, et al., issued Apr. 24, 1990. The intended purpose of the adjustment structure in the Iwasaki patent is to provide counteradjustment to the seat when the seat post is raised thereby shifting the seat farther from the handlebars. The seat of Iwasaki remains horizontal at all times, however.

Very little if any attention has been directed to providing a seat which is adjustable about a horizontal axis transverse the longitudinal axis of the bicycle frame or seat. Rotational adjustment is disclosed in U.S. Pat. No. 3,302,970 to Rizzato, issued Feb. 7, 1967, in which an arcuate ratcheting bracket facilitates rotation of the seat about an axis point below the seat. However, the Rizzato seat is designed to maintain the seat in a horizontal orientation in response to adjustment of the seat post. U.S. Pat. No. 4,978,167 to Harvey, issued Dec. 18, 1990, also teaches a structure providing a slight downward tilt of the seat to encourage shifting of the rider's body weight to a body support associated with the horn of the seat.

The aforementioned mechanisms were developed in response to riding trends of the time, which typically comprised riding on flat, well-maintained roads in the city. However, in the past decade or so there has been an upsurge in the popularity of riding bicycles in rough terrain areas like mountainsides, dunes, and the like. Thus, bicycles have been developed, popularly called "mountain bikes" or BMX bikes, which provide certain features facilitating travel through other than flat, smooth terrain. Under certain conditions of riding through rough terrain, it is particularly desirable, and perhaps necessary, for the rider to position his or her body at an angle to the longitudinal frame of the bicycle in order to adjust the rider's center of gravity and to distribute his weight to facilitate movement. For example, when riding uphill, it is advantageous for the rider to shift his body weight forward on the bicycle to provide more leverage on the pedals. When riding downhill, the rider's body is preferably shifted backward on the seat to counterbalance the downward force of gravity.

It can be seen, therefore, that it would be advantageous to provide a seat having structure providing adjustability of the seat about a horizontal axis transverse the longitudinal axis of the bicycle frame in order to retain the bicycle seat squarely, and comfortably, beneath the rider under all types of riding conditions. It would also be advantageous for such structure to be operable while the rider is seated on the bicycle, and adjustable within a matter of seconds.

SUMMARY OF THE INVENTION

In accordance with the present invention, a bicycle seat has associated structure which provides for adjustment of the seat about a horizontal axis transverse the longitudinal axis of the bicycle frame thereby enabling tilting of the seat in an arcuate traverse about the horizontal axis. The structure provides for rotation of the seat while the rider is positioned on the bicycle, and rotation can be accomplished within seconds. The structure further provides for adjustment of the seat in a horizontal plane parallel to the longitudinal axis of the bicycle frame to increase the multiplicity of positions achievable in the seat. Although the structure of the present invention is adaptable to a variety of seats or saddles associated with wheeled vehicles, this disclosure focusses on the structure as part of a conventional two-wheeled bicycle by way of example.

The present invention generally comprises interconnected first and second members of a seat post which are pivotally rotatable with respect to each other about a horizontal axis. A housing generally surrounds one or more of the members of the seat post and includes interlocking means which engage a locking means associated with one of the members of the seat post. The housing, and thus the interlocking means, may generally be held in engagement with the locking means by securement means. The securement means is operable by movement of a lever which repositions the securement means to thereby allow the interlocking means to temporarily disengage from the locking means to permit rotation about the pivot point. When the seat has rotated to a desired position, the lever is moved again to allow the securement means to secure the interlocking means back into engagement with the locking means.

In a particularly suitable embodiment, the housing generally surrounds the seat post members in the vicinity of the pivot point. At least one, and preferably two, sections of the housing, positioned opposite to each other with respect to the housing, are configured with a plurality of notches corresponding to the different angles which may be assumed by the seat as a result of rotation. At least one pin projects from the second seat post member and is aligned with the notched section or sections of the housing. The housing is spring biased, and the spring is positioned between a ridge associated with the seat post member and a ridge association with the housing.

In a preferred embodiment, a lever positioned directly below the horn of the seat may be raised by the rider's hand to initiate the adjustment. The lever raises the housing thereby compressing the spring, and the notched section or sections disengage from the pin or pins. The first seat post member to which the housing is attached may then be rotated relative to the second seat post member by slight pressure applied by the rider to the horn of the seat or the rear portion of the seat. The lever is then released by the rider, the spring expands forcing the housing downwardly, and the pin or pins then engage a new notch in the notched section of the housing.

The structure of the present invention also includes sliding positionable means located directly below the seat which provides back and forth movement of the seat along a horizontal axis parallel to the longitudinal axis of the bicycle frame. A bracket is associated with the seat post member positioned closest to the seat, and a single sliding arm is positioned within the bracket. A single sliding arm eliminates the binding which occurs with devices which employ two prongs or rails. The sliding arm is attached to the underside of the seat. Locking means is positioned proximate the bracket and secures the sliding arm in place within the bracket. The locking means may be quickly loosened to allow movement of the sliding arm within the bracket, and thereafter the locking means is tightened again to secure the sliding arm in place.

Adjustment of the seat about a horizontal axis transverse the longitudinal axis of the bicycle frame and longitudinal adjustment of the seat parallel to the longitudinal axis of the bicycle frame may both be accomplished quickly while the rider is positioned on the bicycle and while the bicycle is moving.

Adjustment of the seat not only facilitates riding of the bicycle under rough conditions, but variable adjustment of the seat makes riding more comfortable because it relieves the pudendal nerve of the pelvis. The pudendal nerve relates directly to sensation in the male scrotum and in the femal labia. Additionally, rotating the seat horn downwardly and moving the seat back horizontally straightens the lower lumbar of the spine thereby relieving pressure on the lower sacral muscles.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENT

Figure 1:
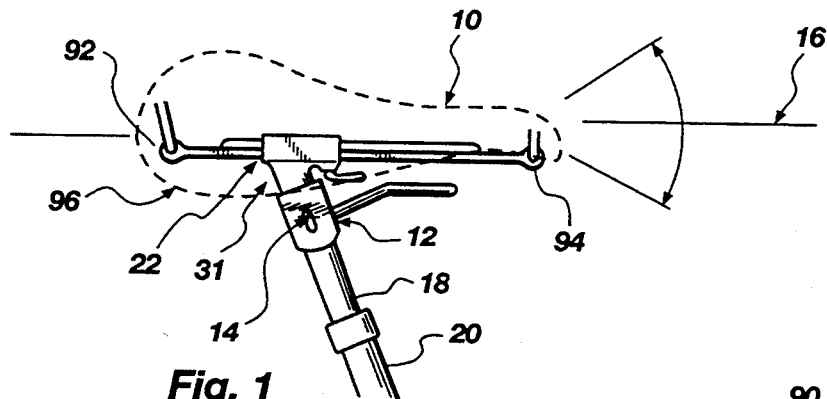
FIG. 1 is a side elevational view generally illustrating the position of the seat, shown in phantom, relative to the structure of the invention.

FIG. 1 generally illustrates the relative positioning of the structure of the invention with the seat 10, shown in phantom, of a bicycle. The structure of the invention includes a mechanism 12 providing adjustability of the seat 10 about a horizontal axis 14, shown in FIG. 1 going into the paper, which is transverse the longitudinal axis 16 of the bicycle frame (not shown) or the seat 10. Thus, with adjustment of the mechanism 12 the seat 10 may be tilted in an arcuate traverse about the horizontal axis 14. The mechanism 12 is positioned below the seat 10 and is part of the seat post 18 which connects to the seat pipe 20 associated with the frame of the bicycle. The invention also includes horizontal adjustment means 22 for sliding the seat 10 forward and backward along the longitudinal axis 16 of the seat 10.

Figure 2:
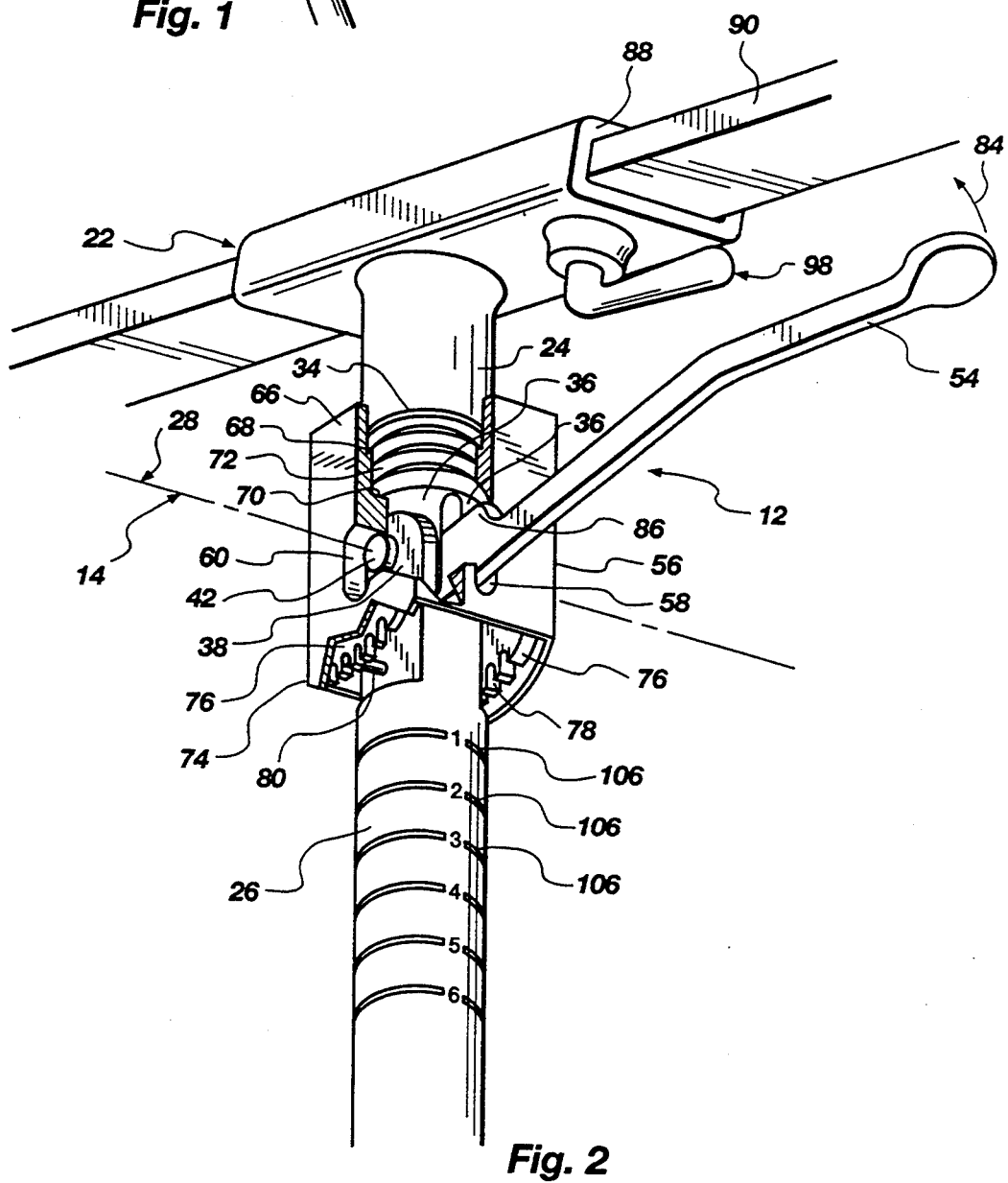
FIG. 2 is an enlarged perspective view in partial cutaway of the structure of the invention.

Mechanism 12 is more clearly illustrated in FIGS. 2-5, and in FIG. 2 it can be seen that the seat post 18 is comprised of a first seat post member 24 and a second seat post member 26 which are interconnected at a pivot point 28 associated with the horizontal axis 14. As illustrated more clearly in FIG. 3, the first seat post member 24 comprises an upper portion 30 and a lower portion 32. Upper portion 30 is positioned proximate to the seat 10 and, as can be seen in FIG. 1, is attached to the horizontal adjustment means 22 at an angle 31. The angled placement of the upper portion 30 relative to the seat provides a greater range of rotation as described further hereinafter. The lower portion 32 has a diameter less than that of the upper portion 30. As a result of the lessened diameter of lower portion 32, a lip 34 is formed about the demarcation point between the upper portion 30 and the lower portion 32.

The lower portion 32 is configured with two parallel and spaced apart leg members 36. The second seat post member 26 is similarly configured with two parallel and spaced apart leg members 38. The leg members 36 of the first seat post member 24 are aligned with the leg members 38 of the second seat post member 26 so that leg members 36 are adjacent leg members 38 when the first and second seat post members are interconnected as shown. An axle pin 40 is positioned through leg members 36 and leg members 38, and either end 42, 44 of the axle pin 40 extends beyond the leg members 38. Washers 46, 48 are positioned between the leg members 36 and leg members 38 to lessen friction, and washer 50 is positioned between leg member 38 and projecting end 44 of the axle pin 40. Generally, a washer does not need be positioned between projecting end 42 and leg member 38, but a washer may be positioned therebetween. Actuating lever 54 is positioned between the spaced apart leg members 36, and the axle pin 40 is positioned through the actuating lever 54.

A housing 56 surrounds part of the first seat post member 24 and part of the second seat post member 26 to enclose leg members 36, leg members 38, axle pin 40 and lower portion 32. A front slot 58, best illustrated in FIG. 2, is formed in the housing through which the actuating lever 54 is positioned. Side slots 60, 62 may also be provided on opposing sides of the housing 56, as shown in FIG. 2, into which projecting ends 42, 44 of the axle pin 40 are positionable, respectively. However, the side slots 60, 62 may actually be formed in the inner wall (not shown) of the housing 56 without being formed through the wall.

The inner bore 64 of the upper section 66 of housing 56 is configured with a first ledge 68 and a second ledge 70. Securement means, here shown as spring 72 which encircles the lower portion 32 of the first seat post 24, is biased between lip 34 and second ledge 70 of the housing. The lower section 74 of housing 56 is configured with an interlocking means, here shown as a toothed cog wheel 76 having notches 78 formed between the teeth therein. A cog wheel 78 may be formed on each of the opposing sides of the housing 56 as illustrated. A locking means, shown most clearly in FIG. 3 as a pin 80 projecting from the second seat post member 26, is positioned relative to the cog wheel 76 so that pin 80 fits into any one of the notches 78 formed in the cog wheel 76.

Figure 5:
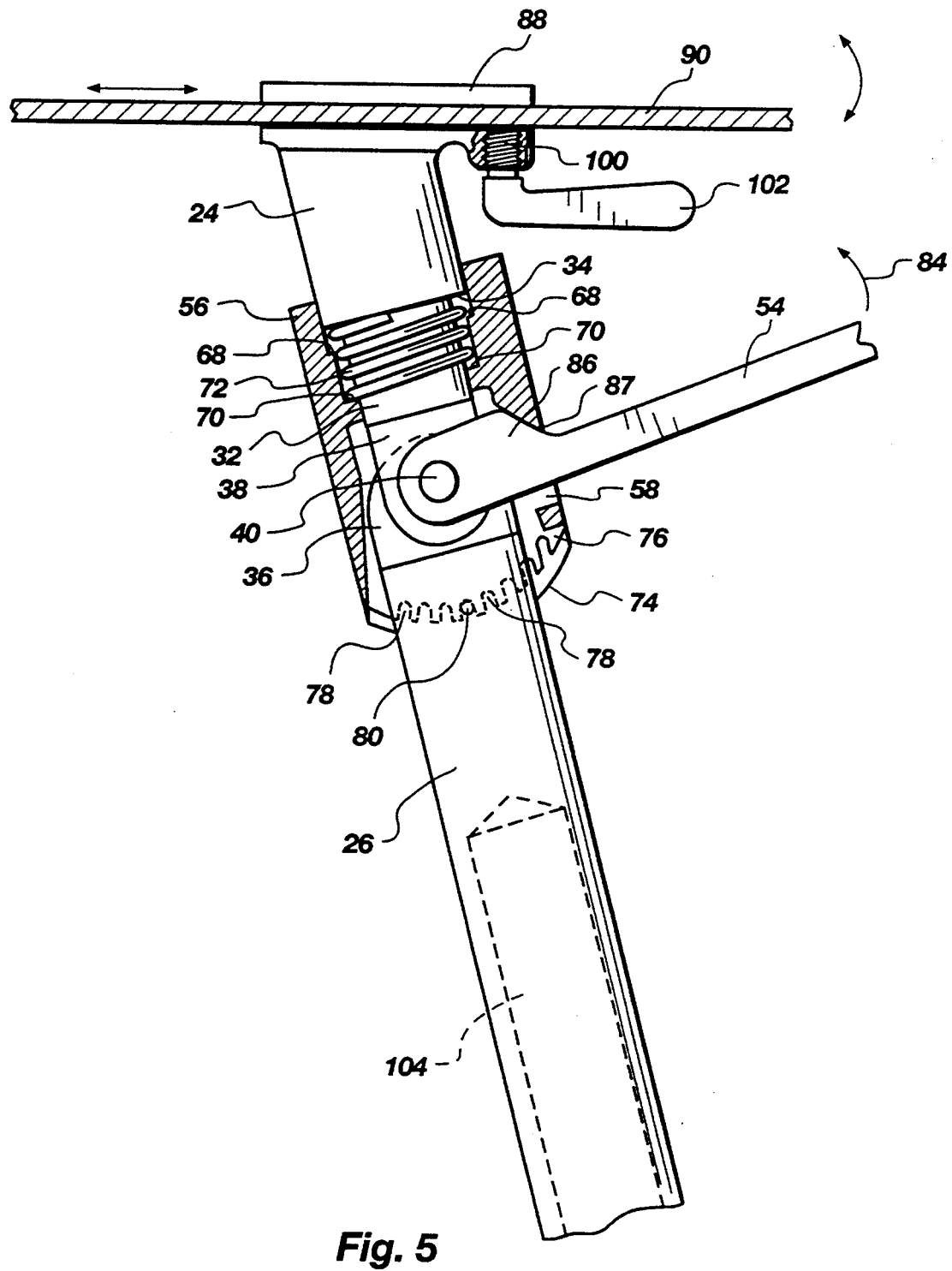
FIG. 5 is a side elevational view in partial section of the structure taken through a vertical plane parallel to the longitudinal axis of the bicycle frame.

Referring to FIGS. 2 and 5, the bicycle seat 10 is adjusted about horizontal axis 14 by urging lever 54 upwardly, in the direction of arrow 84, toward the horn of the seat. Cam 86, formed as part of lever 54, impacts against the upper end 87 of front slot 58 and causes the housing 56 to be urged upwardly toward seat 10. Spring 72 is thereby compressed between second ledge 70 and lip 34 by the upward movement of the housing 56. Upward movement of the housing 56 is limited by the impact of first ledge 68 against lip 34.

With upward movement of the housing 56, the cog wheel 76 is raised so that pin 80 is disengaged from the notch 78 within which it was previously situated. The cog wheel 76 is thereby distanced from pin 80 and first seat post member 24 and second seat post member 26 are free to rotate relative to each other in any direction. If, for example, the rider desires to tilt the seat so that the horn of the seat 10 is lower than the back of the seat 10, the rider applies a slight pressure to the horn thereby causing first seat post member 24 to rotate about axle pin 40 until the desired tilt is obtained.

The actuating lever 54 is then released. The spring 72 expands again urging housing 56 away from first seat post member 24. Pin 80 then becomes seated in another notch 78 formed in cog wheel 76. As can best be seen by FIG. 2, which shows only one side of the housing 56, the end 42 of the axle pin 40 projects outwardly from leg member 38 and extends into slot 60. When the actuating lever 54 is not operated, and thus the housing 56 is not raised with compression of the spring 72, the top of slot 60 may rest upon the projecting end 42 of the axle pin 40. When the actuating lever 54 is operated and the housing 56 is raised with compression of the spring 72, the bottom of the slot 60 comes into contact with the end 42. The action just described occurs also with respect to projecting end 44 and slot 62 which are not visible in FIG. 2.

The seat 10 may also be adjusted so that the horn of the seat 10 is positioned higher than the back of the seat 10 by following the same procedure described previously, but by either applying slight pressure to the back of the seat 10 or by raising the horn of the seat 10 to urge rotation of the first seat post member 24 about axle pin 40 in the opposite direction.

The aforementioned components of the invention may be manufactured from any suitable material. A particularly suitable material for the first and second seat post members may be chrome plated flat ground steel because of the inherent strength of such material. Likewise, the axle pin 40 and cog wheels 76 may be of that chrome plated steel. The leg members 36 and 38 may suitably be made from aluminum alloy with an anodized hard coat finish in order to reduce friction and facilitate movement of those structures.

The invention also includes horizontal adjustment means 22 which provides movement of the seat 10 in a horizontal plane parallel to the longitudinal axis 16 of the bicycle frame or the seat 10. The horizontal adjustment means 22 generally comprises a bracket 88 attached to the first seat post member 24 and a sliding arm 90 slidably positioned within bracket 88. The bracket 88 shown in FIG. 2 is welded or otherwise securely attached to the first seat post member 24. But, alternatively, the bracket 88 may be integrally formed as part of the first seat post member 24. The bracket 88 may suitably be made of aluminum alloy with an anodized hard coat finish while the sliding arm 90 is suitable made of carbon graphite material to facilitate sliding movement therebetween.

Figure 3:
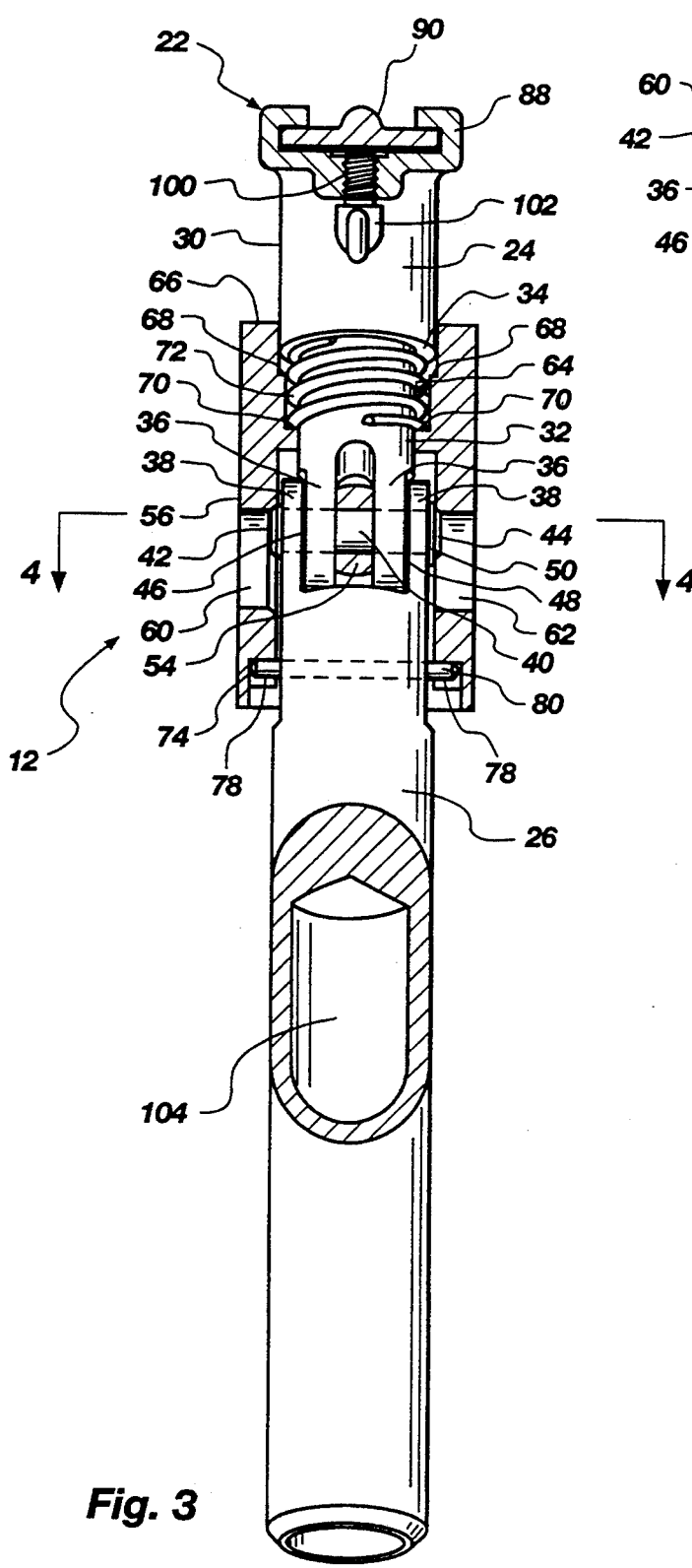
FIG. 3 is an elevational view in partial section of the structure taken through a vertical plane transverse the longitudinal axis of the bicycle frame.
Figure 4:
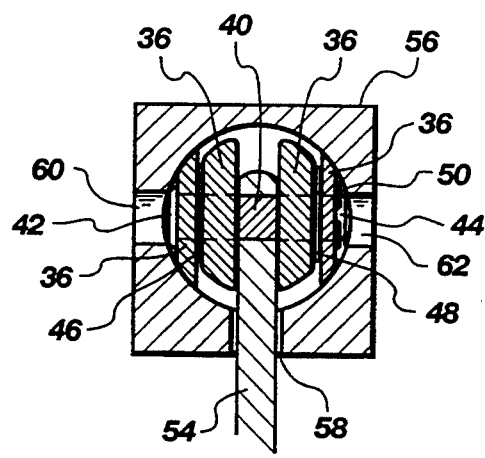
FIG. 4 is a plan view in cross section through line 4—4 of FIG. 3.

The sliding arm 90 is attached at either end 92, 94 to the under side 96 of the seat 10, as shown in FIG. 1. The sliding arm 90 is held in place within the bracket 88 by securement means 98. As illustrated by FIGS. 2, 3 and 5, the securement means 98 may be adjustable screw means 100 which is disposed through the bracket 88 and which applies pressure against the sliding arm 90 to keep the sliding arm 90 secured against the bracket 88. The adjustable screw means 100 may be tightened or loosened by rotation of a handle 102. The illustrated embodiment of the horizontal adjustment means 22 provides simple, fast adjustment of the seat 10 while the rider is positioned on the bike.

The invention may be integrally formed with the frame of the bicycle during manufacture of the bicycle. Alternatively, the invention may be manufactured to be retrofitted to an existing bicycle frame. If retrofitted, the second seat post member 26 may be configured as shown in FIGS. 3 and 5 with a hollow section 104 sized to receive a standard seat pipe (not shown) extending upwardly from the frame of the bicycle. Alternatively, the second seat post member 26 may be sized in circumference to be insertable into a seat tube member (not shown) associated with the frame of the bicycle. Adjustment means (not shown) may be associated with the second seat post member to adjustably accommodate variance in sizes of seat tubes.

The present invention is configured to be removable from one bicycle and placeable on another; for example, removed from a mountain bike and placed on a racing bicycle. Standard height adjustment means (not shown) may be associated with the second seat post member 26 to provide adjustable distance between the seat 10 and the frame thereby increasing or decreasing the height of the seat 10. Accordingly, numerical indicators 106 may be formed in the surface of the second seat post member 26 to facilitate determination of the proper height adjustment of the second seat post member 26.

The present invention is directed to providing adjustability of the seat of a wheeled vehicle, such as a bicycle, about a horizontal axis transverse the longitudinal axis of the vehicle, particularly while the rider is positioned on the vehicle and is in need of responding to changing conditions in the riding environment. The present invention is also directed to providing simplified horizontal adjustment of the seat relative to the longitudinal axis of the vehicle while the rider is positioned on the vehicle and is responding to changing conditions of the riding environment. The present invention is adaptable to a variety of wheeled vehicles having a seat or saddle and is configured to be readily interchangeable between various types of bicycles. Therefore, reference herein to specific details of the illustrated embodiment is by way of example and not by way of limitation. It will be apparent to those skilled in the art that many modifications of the basic illustrated embodiment may be made without departing from the spirit and scope of the invention as recited by the claims.

What is claimed is:

1. An adjustable seat for a wheeled bicycle comprising:
   a seat post attachable to a seat pipe of a bicycle, said seat post comprising a first seat post member attachable to a seat and a second seat post member attachable to said seat pipe;
   an axle pin positioned through said first and second seat post members to render said first and second seat post members articulable relative to each other;
   a housing positioned about said first and second seat post members proximate to said axle pin;
   interlocking means attached to said housing for maintaining said first seat post member in a selected position relative to said second seat post member;
   locking means attached to said second seat post member and engageable with said interlocking means for maintaining said interlocking means in a selected position; and
   securement means associated with said housing for securing said interlocking means in engagement with said locking means, said securement means being a spring biased between said housing and said first seat post member.

2. The adjustable seat of claim 1 wherein said actuating means is a lever having a first end through which said axle pin is rotatably positioned, a second end which projects through a slot formed in said housing and graspable by a rider, and a cam positioned to impact with said housing to move said housing in a manner to provide compression of said spring.

3. The adjustable seat of claim 2 wherein said interlocking means is at least one toothed cog wheel attached to said housing, said at least one toothed cog wheel having notches formed between said teeth thereof.

4. The adjustable seat of claim 3 wherein said locking means is at least one projection extending from said second seat post member in alignment with said at least one cog wheel, said at least one projection being sized to fit within a said notch formed in said at least one cog wheel.

5. The adjustable seat of claim 4 further including structure attached to said first seat post member providing horizontal adjustment of said seat while a rider is positioned on said seat.

6. The adjustable seat of claim 5 wherein said structure providing horizontal adjustment of said seat further comprises a bracket attached to said first seat post member and a slidable arm slidably positioned within said bracket, said slidable arm being attachable to said seat.

7. The adjustable seat of claim 6 further including securement structure attached to said bracket providing securement of said slidable arm in a selected position within said bracket, said securement structure including means for adjusting said securement structure which is graspable by a rider while seated on said seat.

8. The adjustable seat of claim 7 further including a plurality of spaced-apart adjustment indicator marks positioned on said second seat post member.

* * * * *